G. D. SUNDSTRAND.
MILLING MACHINE.
APPLICATION FILED MAY 23, 1910.

1,008,753.

Patented Nov. 14, 1911.

2 SHEETS—SHEET 1.

Witnesses:
W. L. Dow.
E. Behel

Inventor:
Gustaf D. Sundstrand
By A. O. Behel
Atty.

COLUMBIA PLANOGRAPH CO., WASHINGTON, D. C.

G. D. SUNDSTRAND.
MILLING MACHINE.
APPLICATION FILED MAY 23, 1910.
1,008,753.
Patented Nov. 14, 1911.
2 SHEETS—SHEET 2.
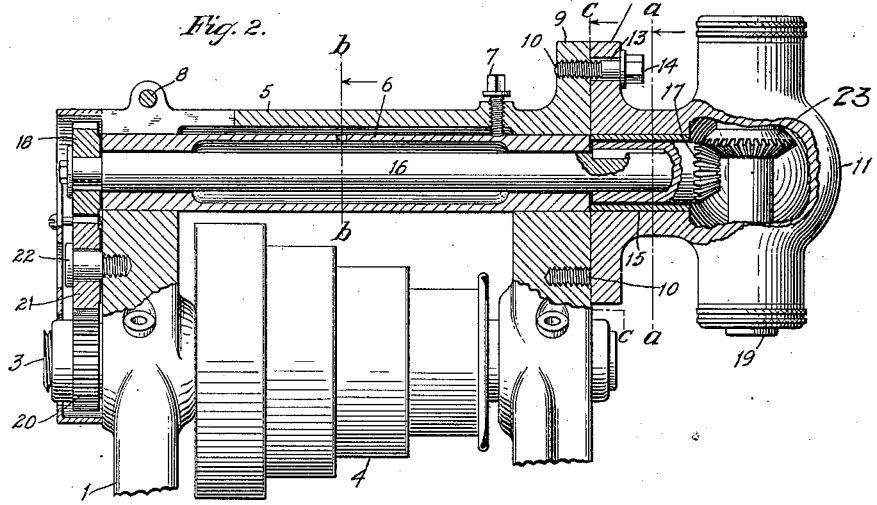
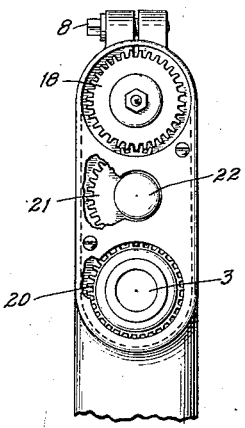
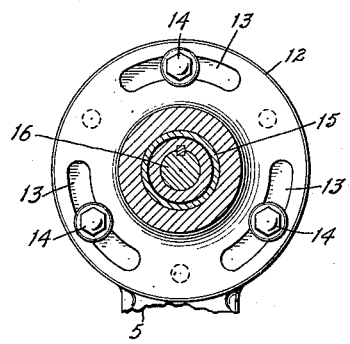
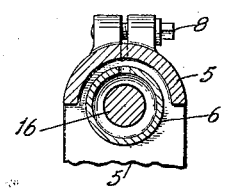
Witnesses:
W. L. Dow
E. Behel
Inventor:
Gustaf D. Sundstrand
By A. O. Behel
Atty.

UNITED STATES PATENT OFFICE.

GUSTAF D. SUNDSTRAND, OF ROCKFORD, ILLINOIS.

MILLING-MACHINE.

1,008,753.   Specification of Letters Patent.   Patented Nov. 14, 1911.

Application filed May 23, 1910. Serial No. 563,022.

*To all whom it may concern:*

Be it known that I, GUSTAF D. SUNDSTRAND, a citizen of the United States, residing at Rockford, in the county of Winnebago and State of Illinois, have invented certain new and useful Improvements in Milling-Machines, of which the following is a specification.

The object of this invention is to produce a milling attachment for milling machines.

Figure 1:
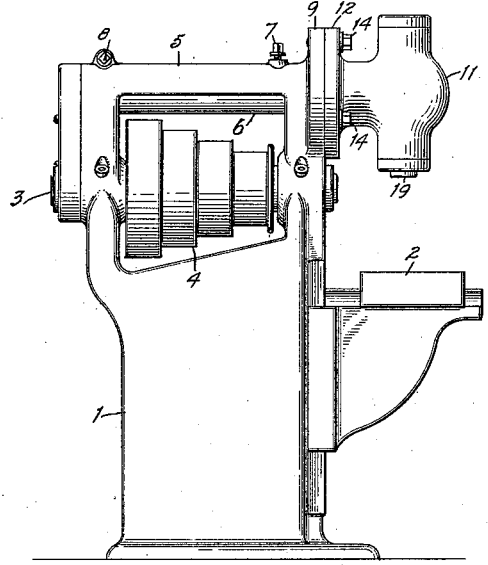
Figure 5:
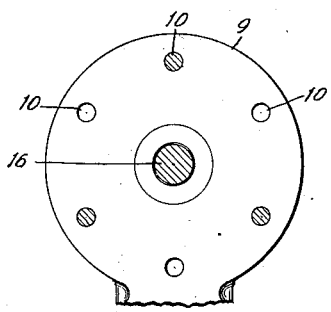

In the accompanying drawings, Figure 1 is a side elevation of my improved milling machine. Fig. 2 is a partial elevation, and in which parts are broken away and sectioned. Fig. 3 is a rear elevation showing the gear drive. Fig. 4 is a section on dotted line $a\ a$ Fig. 2. Fig. 5 is a section on dotted line $c\ c$ Fig. 2. Fig. 6 is a section on dotted line $b\ b$ Fig. 2.

The milling machine comprises the base 1 supporting the table 2 and a shaft 3 driven by a belt connection with the cone pulley 4. A cutting head can be rotated by being connected to the shaft 3, and will operate on the material supported by the table 2. From the base 1 extends a frame 5 which supports a sleeve 6 and which is held in position in the frame by the set screw 7 and clamping bolt 8. The frame 5 has a circular enlargement 9 provided with screw-threaded openings 10.

A head 11 has a circular flange 12 provided with three concentric slots 13 and screw bolts 14 passing through the slots into the openings 10 serve to connect the head to the frame 5. Centrally of the head 11 and concentric with the slots 13 is located a bushing 15. A shaft 16 is supported by the sleeve 6 and to one end is keyed a bevel pinion 17, and to its other end is connected a spur gear 18. A drill spindle 19 is supported by the head 11 and has a bevel gear 23 connected to it, and meshes with the bevel gear 17 on the shaft 16.

A spur gear 20 has a driving connection with the shaft 3 and an intermediate spur gear 21 is supported by the stud 22. This intermediate spur gear 21 meshes with the spur gears 18 and 20 thereby driving the shaft 16 in the same direction the shaft 3 is rotating.

By supporting the head in the manner shown it can be turned axially in either direction from a vertical, the limit of the slots 13, and by changing the screw bolts 14 into the remaining holes 10 a greater range of movement of the head can be had.

By the employment of the sleeve 6 held by the set screw 7 and clamping bolt 8 against rotation, it forms a bearing for the shaft 16, and upon the removal of the shaft and sleeve an overhanging arm can be inserted in their stead. The sleeve prevents the wearing of the main bearing as it takes the wear of the shaft.

The flanged projection 9 is formed a part of the main frame and thereby holds the head in a rigid and adjustable manner.

I claim as my invention.

1. A milling machine, comprising a frame having a faced projection and a bore that opens through the face of the projection, a sleeve that is located in the bore and terminates at the face, a head rotatably mounted on the face of the projection, a shaft journaled in the sleeve and projecting into the head, a gear on the projecting end of the shaft of no greater diameter than the sleeve, and a tool-holding shaft journaled in the head and having a gear meshing with the gear of the shaft.

2. A milling machine, comprising a frame having a face and a bore opening through said face, a hollow head rotatably mounted on the face and having a bore alined with the bore of the frame and of substantially the same diameter as said bore of the frame, a sleeve detachably fixed in the bore of the frame, a sleeve located in the bore of the head and having an opening therethrough of greater diameter than the bore of the sleeve which is located in the frame, a shaft journaled in the sleeve of the frame and projecting into the sleeve of the head, a gear fitted on the projecting end of the shaft and having a portion located in the sleeve of the head, said gear having teeth arranged outside said sleeve, and a tool-holding spindle journaled in the head and having a gear meshing with the gear of the shaft.

In testimony whereof I have hereunto set my hand in presence of two subscribing witnesses.

GUSTAF D. SUNDSTRAND.

Witnesses:
A. O. BEHEL,
E. D. E. N. BEHEL.

---

Copies of this patent may be obtained for five cents each, by addressing the "Commissioner of Patents, Washington, D. C."